No. 619,283. Patented Feb. 14, 1899.
H. M. CRIPPEN.
CONVERTIBLE AGRICULTURAL BOILER.
(Application filed Feb. 25, 1898.)
(No Model.) 3 Sheets—Sheet 1.
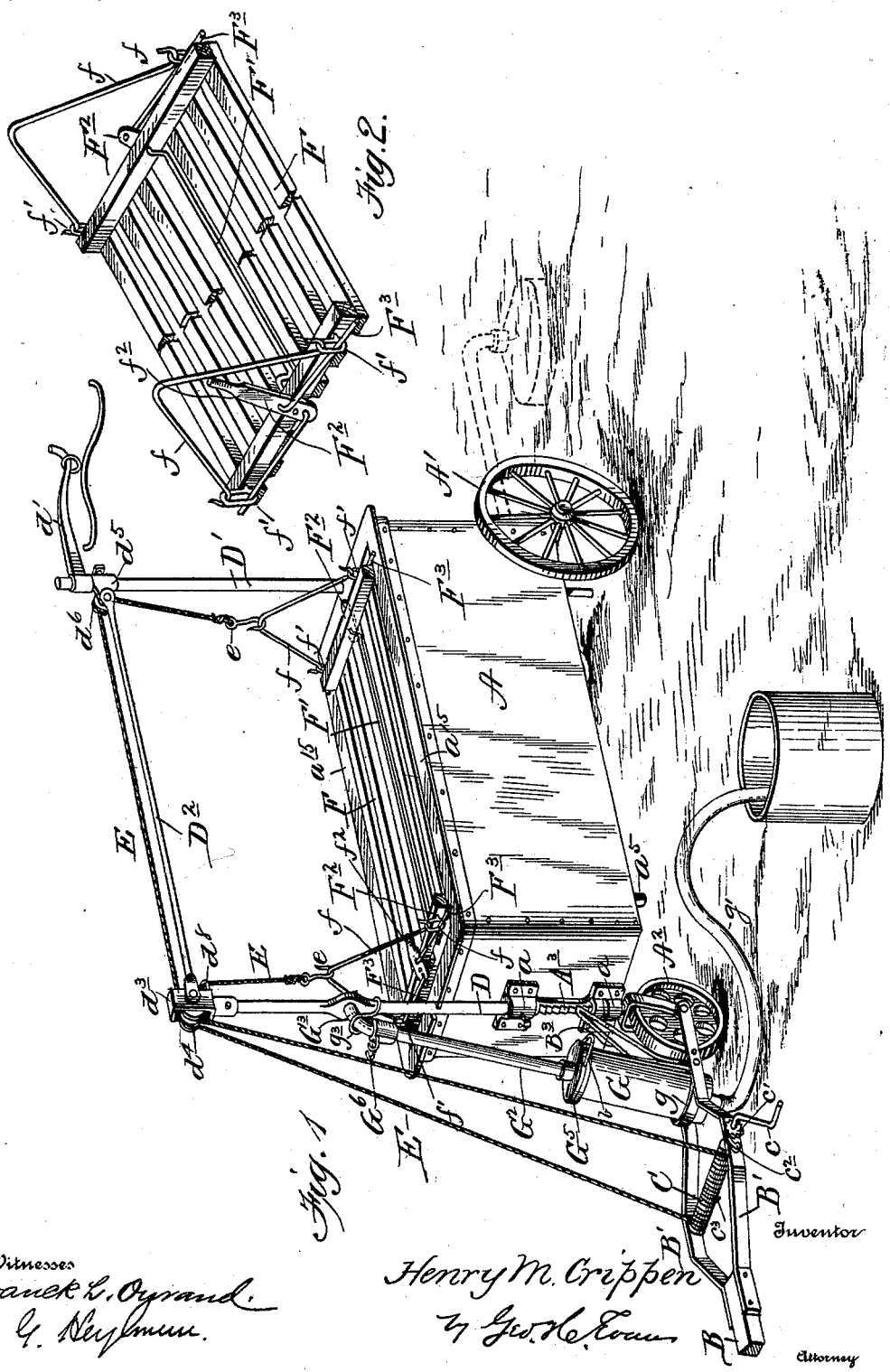

No. 619,283.   Patented Feb. 14, 1899.
H. M. CRIPPEN.
CONVERTIBLE AGRICULTURAL BOILER.
(Application filed Feb. 25, 1898.)
(No Model.)   3 Sheets—Sheet 2.
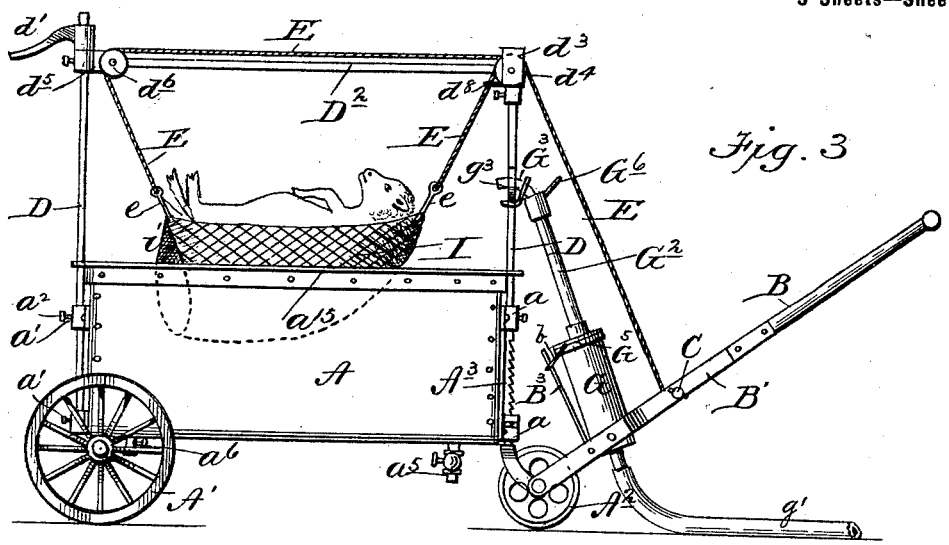
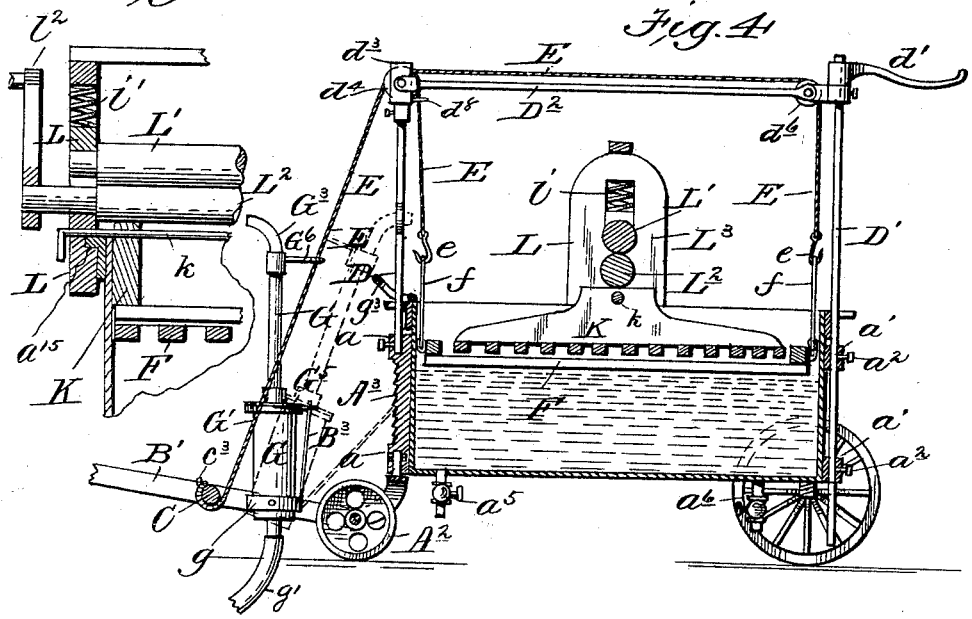
Witnesses
Franck L. Ourand
Chas. H. Ourand
Inventor
Henry M. Crippen
by Geo. K. Evans
Attorney
THE NORRIS PETERS CO., PHOTO-LITHO., WASHINGTON, D. C.

No. 619,283. Patented Feb. 14, 1899.
H. M. CRIPPEN.
CONVERTIBLE AGRICULTURAL BOILER.
(Application filed Feb. 25, 1898.)
(No Model.) 3 Sheets—Sheet 3.
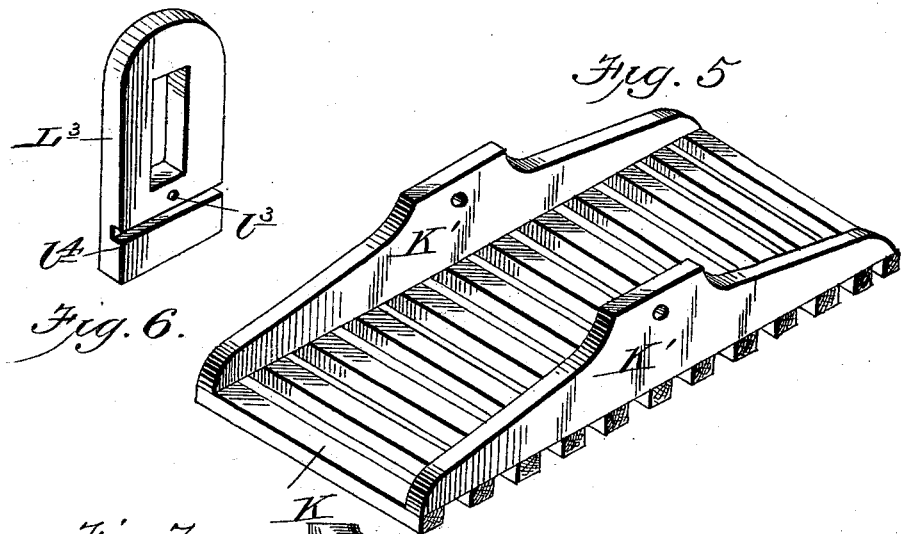
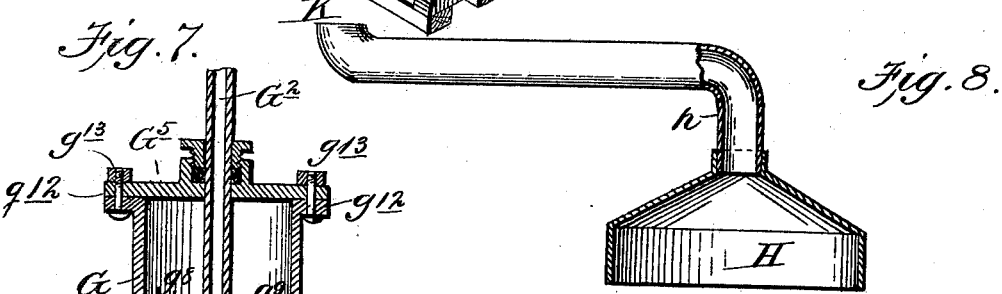
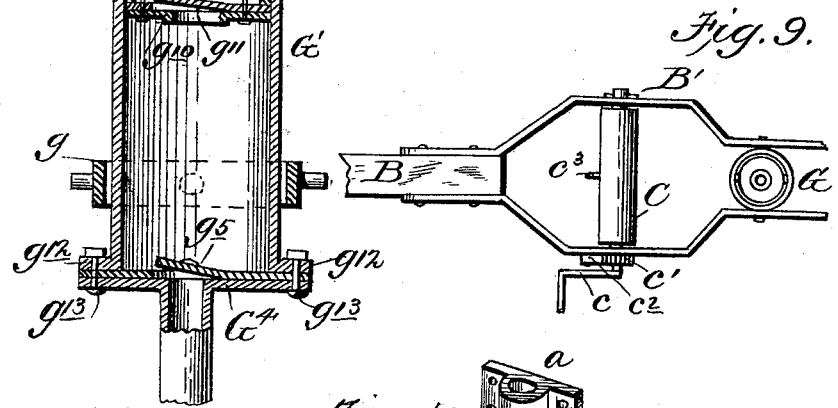
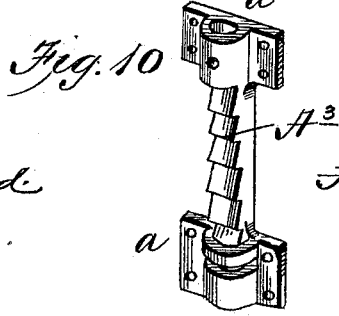
Witnesses
Franck L. Ourand
A. G. Heysmun
Inventor
Henry M Crippen
by Geo. H. Evans
Attorney

UNITED STATES PATENT OFFICE.

HENRY M. CRIPPEN, OF ATHENS, OHIO.

CONVERTIBLE AGRICULTURAL BOILER.

SPECIFICATION forming part of Letters Patent No. 619,283, dated February 14, 1899.

Application filed February 25, 1898. Serial No. 671,655. (No model.)

*To all whom it may concern:*

Be it known that I, HENRY M. CRIPPEN, a citizen of the United States of America, residing at Athens, in the county of Athens, in the State of Ohio, have invented certain new and useful Improvements in Convertible Agricultural Boilers, of which the following is a specification.

My invention relates to that class of agricultural boilers which are mounted on wheels and provided with means for lowering and raising hogs in and out of the boiler or tank.

The objects of my invention are to provide such a tank with improved means for raising and lowering the hogs to be scalded, to provide a crane for suspending the scalded hogs, to provide a hammock for holding sheep to be washed when the hog-supporting rack is removed, to provide a pump actuated by the tank-tongue to supply the tank with fresh water or to discharge water or a disinfecting solution from the tank for the purpose of spraying trees and plants, to provide a smoke-funnel which may be connected to the tank to conduct smoke therein for the purpose of smoking meats contained therein, and to provide an attachment by means of which heavy articles—such as horse-blankets, carpets, &c.—may be washed and wrung. I attain these objects by the mechanism illustrated in the accompanying drawings, in which—

Figure 1 is a front perspective of the apparatus as arranged for scalding hogs, the rack or support for the hogs being supported on the upper edge of the tank. Fig. 2 is a perspective view of the hog-rack removed. Fig. 3 is a side elevation of the apparatus as adjusted for washing sheep. Fig. 4 is a side elevation, partly in section, showing the apparatus as arranged for washing and wringing heavy articles. Fig. $4^a$ is a detail section thereof. Fig. 5 is a perspective of the upper removable frame, in connection with which the hog-rack operates as the movable member of the washing-machine. Fig. 6 is a detail view of the inner side of one wringer-standard. Fig. 7 is a longitudinal vertical section of the pump. Fig. 8 is a detail view showing the smoke-funnel. Fig. 9 is a detail of the tongue and the windlass thereon. Fig. 10 is a perspective of the rack on the front of the tank.

A is the boiler or tank, preferably of light boiler-iron, and provided with rear wheels A' A' and a front central caster-wheel $A^2$. The bottom of the tank has a suitable waste-outlet $a^5$ and a smoke-inlet $a^6$ at the rear end.

B is the tongue or handle, the inner end of which is formed of longitudinal bars B' B', connected to the axis of the caster-wheel and bowed outwardly to receive within such bowed portions the windlass C, provided with an operating-crank $c$ and a ratchet-wheel $c'$, with which engages the locking-pawl $c^2$. The middle of the windlass is provided with a pin $c^3$ for the bend of the hoisting-rope, as will presently appear.

The front end of the boiler or tank A is provided with a socket $a$, into which fits removably the lower end of the vertical standard D. The rear removable standard D' is vertically adjustable in the keepers $a'\ a'$, provided with set-screws $a^2$, and is provided at its upper end with a horizontally-projecting swinging arm $d'$, terminating in a hook to support a gambrel, as shown in Fig. 1, so that said standard D' constitutes a crane, as will be further described. The arm $d'$ rests on a collar or shoulder on the standard D'.

The standard D is provided at its upper end with a pulley-support $d^3$, in which are mounted pulleys $d^4$, and the upper end of the standard D' is provided with a pulley-support $d^5$, in which turns the pulley $d^6$. The pulley-supports $d^3\ d^5$ are connected by a horizontal brace-bar $D^2$. Thus a removable frame is provided for the hoisting mechanism. The pulley-support $d^3$ is provided with a guard $d^8$ at its inner lower portion to always hold the depending end of rope E on its pulley $d^4$.

E is the hoisting-rope, the two runs of which are passed over the pulleys $d^4\ d^6$, respectively, with their lower ends terminating in hooks $e\ e$. The bend of the rope E is simply hooked over the windlass-pin $c^3$, as shown in Fig. 4, so that it may be readily disconnected when the standards D D', &c., are removed from the tank A, as before described.

In order that the tongue or handle B may be held depressed, as in Fig. 1, to permit the windlass to be operated, I provide it with a latch $B^3$, the lower diverging ends of which are pivoted to the bars $B'$ $B'$, while the free end is adapted to engage a vertical rack $A^3$, secured to the socket $a$.

F is a rack or support provided at its ends with bails $ff$, adapted to be engaged by the hooks $e$ $e$ and lowered within the tank. In order that the rack or support may be supported on the upper edge of the tank A after the hooks $e$ have been disconnected, I provide a longitudinal rock-shaft $F'$, which extends from end to end of the rack and is provided on its opposite ends with rigidly-connected cross-pieces $F^2$, to which the inner ends of sliding bolts $F^3$ are pivotally connected, said bolts passing through the eyes $f'$, to which the bails are secured. One cross-piece $F^2$ is extended to form an operating-handle $f^2$ for rocking the shaft. The shaft is cranked, so as to lie in the space between the longitudinal bars of the rack F. Thus by operating the handle $f^2$ in one direction the bolts will be slid outwardly over the upper edge of the tank, and when moved in the opposite direction the bolts will be retracted, and the rack or support F may be lowered in the tank.

It will be seen that by removing the standards D $D'$ and their connected parts the tank may be used to haul water or as a feed cooker or boiler.

When the rack F is supported as in Fig. 1, the hooks $e$ $e$ may be released and rope E unwound from the windlass to permit the hooks to be engaged with a hog to be scalded. Then by rotating the windlass the hog may be raised and placed on the rack F, the hooks $e$ again connected to the bails $f$, the bolts $F'$ retracted, the latch $B^3$ released from rack $A^3$, and the tongue B allowed to rise, which will permit the hog to descend into the scalding-water contained in the tank, the water being heated, as usual, by a fire built under the tank. By raising and lowering the tongue the rack and hog will be raised and lowered till the scalding has been effected. Then the tongue will be swung down, as in Fig. 1, and its latch engaged with rack $A^3$. The rack F will now be at the top of the tank and its bolts $F'$ will be projected. The hog may now be scraped and the crane-arm $d'$ swung inwardly over the rack. The hooks $e$ will be connected to a gambrel placed between the hind feet of the hog, and the windlass will be operated to raise the animal, or the rack containing the hog may be raised by the windlass, so that the gambrel may be hooked on the crane-arm, which is then swung around and the hog will be suspended.

The tank will be supplied with water by means of a pump G, connected at the lower end of its barrel $G'$ by a gimbal or universal joint $g$ with the side bars $B'$ of the tongue in rear of the windlass, while the tubular piston-rod $G^2$ is removably connected at its upper or discharge end to the standard D by means of a laterally-projecting nipple $G^3$, extending through a hole in the standard and secured detachably thereon by an angular clip $g^3$. Thus by working the tongue up or down the pump-barrel will be reciprocated on the piston and the water will be drawn in through flexible supply pipe or hose $g'$ from any suitable source and discharged through the nipple $G^3$. By partially opening the outlet $a^5$ the foul water may escape while fresh water is being supplied.

When the pump G is not to be operated, it is simply necessary to disconnect the nipple $G^3$ from the standard D or other stationary part of the apparatus to which it may be affixed, and the piston may be reversed and the hooks $G^6$ on its upper end engaged with the rope, as shown in Fig. 4, on which they will slide when the tongue B is raised and lowered. The lower head $G^4$ of the pump-barrel is provided with an outlet-opening controlled by an ordinary leather flap-valve $g^5$, and around the outer side of the opening is formed a nipple for the inlet-pipe $g'$. The upper head $G^5$ has a central packing-gland, through which the piston-rod $G^2$ works, and the inner end of the rod is provided with a flaring head $g^8$, having apertures $g^9$. To this head $g^8$ is bolted the valve-plate $g^{10}$, which is provided with an inlet-opening controlled by a leather flap-valve $g^{11}$. The upper and lower barrel-heads are secured to the ends of the barrel by registering apertured lugs $g^{12}$ and bolts $g^{13}$. As the operation of the pump is obvious, a detailed description is deemed unnecessary. A bail $b$ is pivoted to the pump-barrel to swing over the upper end of latch $B^3$ and hold it when retracted. It will be evident that by removing the hog raising and lowering mechanism and filling the tank with a suitable spraying solution the hose $g'$ may then be coupled to nipples $a^5$ and a discharge-hose connected to nipple $G^3$, whereupon by operating the tongue B up and down trees, plants, &c., may be sprayed with the solution, or a fire-extinguishing fluid may be substituted and thrown upon a burning building, &c.

H is a horizontal smoke-funnel having a pipe $h$, adapted to be coupled to the nipple $a^6$ at the lower rear portion of the tank. (See dotted lines, Fig. 1.) By making a sawdust fire under this funnel the smoke will be conducted into the tank. Hams may be placed on the rack F and a suitable covering thrown over the tank, and the entering smoke will thoroughly smoke and cure the hams.

When sheep are to be washed, the only change in the apparatus, as shown in Fig. 1, is to remove the rack or support F and substitute the cloth hammock-like support I, as shown in Fig. 3. This support I is formed of a triangular piece of heavy cloth, with two of its corners connected to one hook $e$ and its other corner connected to the other hook. This will leave an open end $i$ for the ingress and egress of the water. A sheep is placed in the support I, as shown, and the tongue B is worked up and down. As the support is lowered the sheep will nearly float and the wool is instantly filled with water. Then when the support is raised it will compress the wool and squeeze out the water. The pump G will keep up a constant supply of fresh water, and a single attendant will thus be enabled to wash sheep without the necessity of standing in a pool or stream of water.

In Fig. 4 I have illustrated the apparatus as arranged to wash and wring heavy articles, like carpets, horse-clothing, sacks, &c. To accomplish this, the rack F is lowered into the tank and a stationary slotted rack or frame K is secured in the top of the tank by means of a long bolt $k$, which passes above both sides of the tank and through the side bars K' of the frame K. The articles to be washed will be placed on the rack F, which will be reciprocated by the tongue B, as heretofore described, to bring the articles up against the stationary frame K to squeeze out the water, as will be readily understood. I also provide a simple wringer L, which is formed of parallel uprights $L^3$, in which are mounted the wooden rolls L' $L^2$, the upper roll L' being forced toward the roll $L^2$ by springs $l'$ and the roll $L^2$ being provided with an operating-crank $l^2$. The attachment to the tank is effected by the long bolt $k$, which passes through apertures $l^3$ in the lower ends of the uprights and above the upper edge of the tank. The inner sides of the uprights or standards $L^3$ are provided near their lower ends with transverse grooves $l^4$, which receive the outwardly-projecting flange $a^{15}$ around the upper edge of the tank. When the nut or bolt $k$ is tightened, the standards $L^3$ will be drawn firmly against the tank and the grooves $l^4$ and flange $a^{15}$ will hold the wringer positively against any tendency to tilt or turn on the attaching-bolt.

The pump G may be set in operation during the washing of the articles referred to if a change of water is desirable.

The apparatus will prove useful for many other purposes than those mentioned.

From the foregoing description of the uses and operation it will be seen that the vertically-movable rack or frame F performs a most important part, since it serves as a support for the hog during the scalding and scraping operation, forms the movable section of the washing-machine and the support for meats being smoked, and it will serve as an agitator for the solution when the apparatus is used as a tree-sprayer.

What I claim is—

1. The combination with the portable tank or boiler and its pivoted tongue, of end standards on the tank, pulleys at the upper ends thereof, a windlass on the tongue, beyond its axis, and ropes extending from the windlass over the said pulleys and provided at their depending ends with hooks or eyes, substantially as described.

2. The combination with the portable tank and its pivoted tongue provided with a windlass having a hook or pin, of standards mounted removably on the tank ends and provided at their upper ends with pulleys, a rope-guard for the front pulley and a rope detachably engaging, at its bend, the said windlass hook or pin and extending thence over said two pulleys and down toward the tank, and hooks on the lower ends of the rope, substantially as described.

3. The combination with the portable tank and its pivoted tongue, a brace or pawl to lock the tongue in its lowered position and a windlass mounted on the tongue independent of the brace or pawl and beyond the tongue-pivot, of standards on the ends of the tank and provided at their upper ends with pulleys, ropes extending from the windlass over the pulleys and down toward the tank and hooks on the ends of the ropes, substantially as described.

4. The combination with the portable tank having end standards provided at their upper ends with pulleys, of a pivoted tongue having a windlass provided with ropes extending over the pulleys with their ends depending toward the tank and provided with hooks, and a support or frame connected at its ends to the said hooks and adapted to be raised and lowered in the tank by working the tongue up and down, and a brace or pawl to lock the handle in its lowered position and thereby hold the support or frame raised, substantially as described.

5. The combination with the portable tank having end standards provided at their upper ends with pulleys, of a pivoted tongue having a windlass, ropes extending from the windlass over the respective pulleys and having hooks on their depending ends, a brace or pawl to lock the tongue in its depressed position and interchangeable supports adapted to be engaged by said hooks and raised and lowered in the tank, substantially as described.

6. The combination with the portable tank having end standards provided with pulleys, of a pivoted tongue having a windlass, ropes extending from the windlass over the pulleys, and provided on their depending ends with hooks, means for holding the tongue in its depressed position, and a rack or frame movable up and down in the tank, suspended from said hooks and provided with means for engaging the upper edge of the tank to hold it raised when the hooks are disconnected, substantially as described.

7. The combination with the portable tank provided with pulley-carrying standards the rear one of which is vertically adjustable, and provided with a horizontally-swinging crane-arm, of a pivoted tongue provided with a windlass, ropes extending from the windlass over the respective pulleys and provided at their depending ends with hooks, a rack or frame detachably suspended in the tank by said hooks and provided with means for engaging the tank and holding it raised when the hooks are disconnected, substantially as described.

8. The combination with the tank having a pulley-carrying frame, a pivoted tongue provided with a windlass, ropes extending from the windlass over said pulleys and provided at their depending ends with hooks, and means for locking the tongue when depressed, of a rack suspended in the tank from said hooks and provided with pairs of oppositely-movable bolts having a common operating-shaft for projecting them over the upper edge of the tank, substantially as described.

9. The combination with the tank having a pivoted tongue provided with a windlass, and a pulley-carrying frame supported removably on the ends of the tank, ropes extending from the windlass over the pulleys and down toward the tank, hooks on the ends of the ropes, and a pawl and rack to hold the tongue depressed, of a rack suspended in the tank from the hooks and provided with means for locking it in its raised position when the hooks are released and a horizontally-swinging crane-arm on the upper rear end of the pulley-frame, substantially as described.

10. The combination with a tank having a pivoted tongue, a frame or support in the tank and operatively connected with the tongue to be raised and lowered thereby, of a pump also operated by the tongue to supply the tank with water and means for rendering the pump inactive, substantially as described.

11. The combination with a tank having a pivoted tongue, a frame or support in the tank and operatively connected with the tongue to be raised and lowered thereby, and a pump mounted on and operated by the tongue and mechanism whereby the pump may deliver water to the tank or withdraw it therefrom, substantially as described.

12. The combination with the portable tank and its end standards provided with guide-pulleys, of a pivoted tongue, a windlass mounted on the tongue, a rope detachably connected at its end to said windlass, extending thence over said pulleys and provided on the lower ends of its depending lengths with suspension devices, a suitable support adapted to be engaged by said suspension devices and raised and lowered in the tank by the raising and lowering of the tongue or by operating the windlass, and means for locking the tongue when the windlass is to be used, substantially as described.

13. The combination with the tank and its pivoted tongue, of a pump carried by the tongue and having a tubular piston-rod adapted to be connected to the tank, and disconnected therefrom, and a supply-pipe for the pump, substantially as described.

14. The combination with the tank and its pivoted tongue, of a pump having the lower end of the barrel pivotally connected to the tongue and provided with an inlet-pipe, a tubular piston-rod extending through the top of the barrel and forming the discharge-pipe thereof, a nipple on the upper end of the piston to discharge into the tank when desired, and means for detachably connecting the nipple to the tank or a part carried thereby, substantially as described.

15. The combination with the tank, provided with a pivoted tongue and a support or rack movable vertically in the tank and operatively connected to the tongue for operation thereby, of a pump having its barrel pivotally connected to the tongue and its tubular piston-rod connected to the tank or part carried thereby and adapted to discharge into the tank, substantially as described.

16. The combination with the tank provided with a pivoted tongue and end standards having pulleys; the front standard being provided above the tank with an opening and a clip, and ropes extending from a windlass on the tongue over said pulleys and provided on their lower ends with hooks, adapted to engage interchangeable rack and hammock-like supports, of a pump having a supply-hose and provided with a tubular piston-rod having a nipple extending rearwardly through the standard-opening and held therein by its clip, hooks on the upper end of the piston to engage the ropes when the piston is released and turned, the base of the pump-barrel being pivotally connected to the tongue for reciprocation thereby, substantially as described.

17. The combination with the tank having rear wheels and a front caster-wheel, a vertically-rocking tongue having side bars or straps at its rear end connected to the axis of said caster-wheel; the said straps being bowed outwardly in advance of the wheel, of a ring pivoted between the said straps, a pump-barrel pivoted in the ring at right angles to the ring-pivots and provided with a supply-hose, and a tubular piston-rod extending through the top of the pump-barrel and provided at its inner end with a valved piston, and means for connecting the discharge end of the piston to the tank, substantially as described.

18. The combination with a portable tank having a pivoted tongue, of a pump operatively connected with the tongue and adapted to discharge into the tank, substantially as described.

19. The combination with the portable tank having a pivoted tongue, of a pump having its piston and barrel connected with the tongue and tank respectively, means for causing the pump to discharge into or away from the tank and a supply-pipe for the pump adapted for connection with the tank or with an independent water-supply; whereby water may be discharged by the pump into the tank or withdrawn therefrom, substantially as set forth.

In testimony whereof I affix my signature in presence of two witnesses.

HENRY M. CRIPPEN.

Witnesses:
H. G. STALDER,
F. STALDER.